United States Patent Office 2,820,017
Patented Jan. 14, 1958

2,820,017

SOLUTIONS OF AN ALPHA-CHLORO-ACRYLO-NITRILE POLYMER STABILIZED WITH HYDROGEN CHLORIDE

Max Henry Dilke, Coulsdon, England, assignor to The Distillers Company Limited, Edinburgh, Scotland, a British company No Drawing. Application January 19, 1954
Serial No. 405,047

Claims priority, application Great Britain
February 7, 1953

6 Claims. (Cl. 260—30.4)

The present invention relates to new compositions comprising solutions of $\alpha$-chloroacrylonitrile polymers.

It has been found that $\alpha$-chloroacrylonitrile polymers, by which term is meant poly-$\alpha$-chloroacrylonitrile and copolymers of $\alpha$-chloroacrylonitrile with other copolymerisable monomers, are useful in the production of films, fibres and other shaped articles by procedures which are well known in the plastics art. Monomers which may be copolymerised with $\alpha$-chloroacrylonitrile to produce $\alpha$-chloroacrylonitrile polymers as defined above, include compounds containing one or more ethylenic linkages such as, for instance, vinyl acetate, vinyl chloride, vinyl pyridine, vinylidene chloride, acrylic acid and its homologues and their esters such as ethyl acrylate and methyl methacrylate, maleic and fumaric esters, styrene, isobutene, butadiene, copolymerisable vinyl and acrylic compounds generally and polymerisable olefinic and diolefinic hydrocarbons generally. The present invention is particularly concerned with $\alpha$-chloroacrylonitrile polymers containing a major proportion of $\alpha$-chloroacrylonitrile units in their molecular structure. Poly-$\alpha$-chloroacrylonitrile and copolymers containing at least 85% of $\alpha$-chloroacrylonitrile units in their molecular structure are particularly suitable for the production of fibres with good physical characteristics.

In the production of films and fibres it is convenient to dissolve the polymer in a suitable solvent and either cast the film or make the fibre from the solution thus produced.

It has further been found that $\alpha$-chloroacrylonitrile polymers are soluble in tetrahydrofuran and its homologues and in various ketonic solvents. Examples of such ketonic solvents are the symmetrical ketones, such as acetone, and the asymmetrical ketones, such as methyl ethyl ketone, methyl propyl ketone, methyl isobutyl ketone, methyl benzyl ketone and the cylclic ketones such as cyclohexanone. The aliphatic acyclic ketones with not more than a total of six carbon atoms in the alkyl groups are particularly useful owing to their good solvent power and ready availability.

However, such solutions are of limited utility because the dissolved $\alpha$-chloroacrylonitrile polymers are not stable and undergo decomposition and degradation on standing. This degradation is indicated by a drop in the viscosity of the solution and frequently by its discolouration. It will, of course, be obvious that solutions of $\alpha$-chloroacrylonitrile polymers in which the latter undergo decomposition cannot be used successfully for the production of films or fibres because such films or fibres, if obtainable at all, would be weakened owing to the lower molecular weight of the degraded polymer and by the presence therein of the decomposition or degradation products. Such films or fibres would also be discoloured by the presence therein of the decomposition and degradation products.

An object of the present invention is to provide solutions comprising $\alpha$-chloroacrylonitrile polymers in which the polymer is substantially stable over a sufficient range of temperatures to enable useful films, fibres and other shaped articles to be produced therefrom.

It has now been discovered that the stability of $\alpha$-chloroacrylonitrile polymers in solution in the above-mentioned solvents may be greatly improved by the presence in such solutions of small quantities of hydrogen chloride.

Accordingly, the present invention provides a composition comprising an $\alpha$-chloroacrylonitrile polymer, as hereinbefore defined, dissolved in a solvent selected from the group consisting of tetrahydrofuran, a homologue thereof and ketones, said solvent containing dissolved therein free hydrogen chloride.

The $\alpha$-chloroacrylonitrile polymers may be prepared by any suitable polymerisation process. The novel compositions of the present invention are particularly useful for the production of films or fibres when they are substantially colourless and, therefore, it is preferred to prepare the compositions from substantially colourless or pale coloured $\alpha$-chloroacrylonitrile polymers which may be prepared according to the process set forth in copending application, Serial No. 407,563, filed February 1, 1954. Briefly stated such process comprises polymerising in aqueous dispersion monomeric material comprising $\alpha$-chloroacrylonitrile in the absence of free molecular oxygen and in the presence of a peroxidic catalyst and a polyfunctional, polymeric dispersing agent, the pH of the aqueous phase of the dispersion being below 7. Examples of suitable dispersing agents include gelatin, polyacrylic acid, polymethacrylic acid, alginic acid, gum tragacanth, agar-agar, glycol cellulose, carboxymethyl cellulose, starch and maleic acid-vinyl acetate and maleic acid-styrene copolymers.

Any solvent of the types hereinbefore mentioned may be used for the preparation of the compositions of the present invention and aliphatic ketones with not more than a total of six carbon atoms in the alkyl groups are particularly suitable.

The $\alpha$-chloroacrylonitrile polymer may be dissolved in the solvent by any suitable means. For instance, the polymer may be finely divided and distributed throughout the solvent by mechanical agitation until solution occurs. The rate of solution may be increased by heating the solvent to an elevated temperature and the total quantity of polymer which may be dissolved may be increased by raising the temperature of the solution.

The hydrogen chloride may be added to the solvent before or after the polymer has been dissolved therein. However, it is generally preferred to add the hydrogen chloride to the solvent before the polymer is dissolved therein in order to avoid degradation of the polymer during the solution process. It is particularly preferred to adopt this procedure when the solution of the polymer in the solvent is carried out at an elevated temperature. Most suitably the hydrogen chloride is added by passing the dry gas through the solvent until a sufficient concentration of hydrogen chloride in the solvent has been obtained.

The quantity of hydrogen chloride in the solutions according to the present invention, may be varied considerably without affecting its stability but it has been found that very small quantities increase the stability of the polymer in solution most markedly. Generally it is preferred that the concentration of the hydrogen chloride based on the volume of the solvent should be in the range 0.01 to 1.0 mole per litre.

The following examples illustrate the remarkable stability of $\alpha$-chloroacrylonitrile polymers in tetrahydrofuran or ketone type solvents containing hydrogen chloride according to the present invention, as compared with their marked instability in the same solvents in the absence of the hydrogen chloride. In each case a solution of an $\alpha$-chloroacrylonitrile polymer was prepared by adding 0.5 gm. of polymer or copolymer in a finely divided form to 100 cc. of the solvent under test already containing the hydrogen chloride and leaving the mixture to stand at room temperature until solution was complete. The solutions so prepared were then allowed to stand at a constant temperature at which it was desired to investigate their stability and their viscosities were then measured at suitable intervals; a fall in the viscosity indicating that degradation with the break down of the polymer chains has occurred.

The specific viscosity of the solutions was measured using an Ostwald Viscometer according to British Standard Specification 188 (1937). The specific viscosity was calculated by the expression:

Specific viscosity =

$$\frac{\text{Flow time of solution} - \text{flow time of solvent}}{\text{Flow time of solvent}}$$

and the viscosity value of a solution is expressed in the following examples as its specific viscosity divided by its concentration in grams per 100 cc.

EXAMPLE 1

A solution of poly-α-chloroacrylonitrile was made up as described above in methyl ethyl ketone containing 0.1 mole per litre of hydrogen chloride. The initial viscosity value of this solution was 10.70 and after standing at 46° C. for 190 minutes, the solution still had substantially the same viscosity. In marked contrast to this the same polymer, when dissolved in pure methyl ethyl ketone and maintained at 46° C., underwent considerable degradation as evidenced by the fall in viscosity value of the solution over a period of 20 minutes. The viscosity values obtained are shown below in Table 1.

*Table 1*

| Time (minutes): | Viscosity value |
|---|---|
| 0 | 6.06 |
| 5 | 5.92 |
| 10 | 5.68 |
| 20 | 5.50 |

Even at 25° C. the solution of poly-α-chloroacrylonitrile in methyl ethyl ketone, showed considerable degradation as shown by the viscosity measurements shown in the Table 2:

*Table 2*

| Time (minutes): | Viscosity value |
|---|---|
| 0 | 6.06 |
| 20 | 5.56 |
| 35 | 5.36 |
| 60 | 4.90 |

Substantially similar solutions are produced when the methyl ethyl ketone used above is replaced with the same volume of tetrahydrofuran, methyl propyl ketone, methyl isobutyl ketone, methyl benzyl ketone or cyclohexanone and in all cases the solutions containing free hydrogen chloride are substantially stable, whereas those made from the pure solvents show marked signs of degradation on standing for a period at an elevated temperature, for instance, 46° C.

EXAMPLE 2

Solutions were prepared by dissolving 0.5 gram of poly-α-chloroacrylonitrile in 100 cc. of acetone containing (a) 0.14 mole of hydrogen chloride per litre and (b) 0.34 mole of hydrogen chloride per litre. The solutions were then stored at 46° C. for one hour when there was no lowering of the viscosity value of the solutions, thus indicating the stability of the poly-α-chloroacrylonitrile solutions.

However, when a solution of poly-α-chloroacrylonitrile in acetone not containing hydrogen chloride was kept at 46° C., degradation took place as shown by figures in the following table:

*Table 3*

| Time (minutes): | Viscosity value |
|---|---|
| 0 | 9.36 |
| 10 | 9.24 |
| 20 | 8.96 |
| 40 | 8.58 |

EXAMPLE 3

A solution of a copolymer of α-chloroacrylonitrile and dimethyl maleate containing 96.5 mole percent of the former, was prepared by dissolving 0.5 gram of the copolymer in 100 cc. of methyl ethyl ketone containing 0.125 mole of hydrogen chloride per litre of solvent. The solution was then stored at a temperature of 40° C. for 40 minutes, during which period there was no significant change in the viscosity value of the solution.

In direct contrast to this a similar solution of the copolymer in pure methyl ethyl ketone showed considerable instability when stored at 40° C. as shown by the figures in the following table:

*Table 4*

| Time (minutes): | Viscosity value |
|---|---|
| 0 | 5.84 |
| 20 | 5.28 |
| 40 | 5.18 |

Substantially similar results were obtained when the copolymer of Example 3 was replaced with the same weight of two styrene-α-chloroacrylonitrile copolymers containing respectively 68 and 52.7 mole percent α-chloroacrylonitrile units in their molecular structure. Similar results are also obtained when the dimethyl maleate copolymer is replaced with other copolymers of α-chloroacrylonitrile with the following monomers: vinyl acetate, vinyl chloride, vinyl pyridine, ethyl acrylate, methyl methacrylate and butadiene.

The increase in stability of α-chloroacrylonitrile polymers which is brought about by the presence of hydrogen chloride in the solution, appears to be specific for solvents of the types hereinbefore mentioned. For instance, solutions of α-chloroacrylonitrile in solvents such as dimethyl formamide show great instability and the addition thereto of hydrogen chloride increases the rate of degradation of the polymer. This is illustrated by the viscosity measurements given in the following Tables 5 and 6. These measurements were obtained on two 0.5% weight/volume dimethyl formamide solutions of poly-α-chloroacrylonitrile over a period of 60 minutes when these maintained at 46° C. The results shown in Table 5 were obtained from a pure dimethylformamide solution and those in Table 6 from a similar solution containing hydrogen chloride:

*Table 5*

| Time (minutes): | Viscosity value |
|---|---|
| 0 | 3.98 |
| 20 | 3.37 |
| 40 | 3.24 |
| 60 | 2.99 |

*Table 6*

| Time (minutes): | Viscosity value |
|---|---|
| 0 | 3.83 |
| 20 | 3.65 |
| 40 | 3.19 |
| 60 | 2.55 |

I claim:

1. A composition comprising an α-chloroacrylonitrile polymer dissolved in a solvent selected from the group consisting of tetrahydrofuran and ketones, said solvent containing dissolved therein free hydrogen chloride.

2. A composition comprising an α-chloroacrylonitrile polymer selected from the group consisting of poly-α-acrylonitrile and copolymers containing at least 85% of α-chloroacrylonitrile units in their molecular structure, dissolved in a solvent selected from the group consisting of tetrahydrofuran and ketones, said solvent containing dissolved therein free hydrogen chloride.

3. A composition comprising an α-chloroacrylonitrile polymer dissolved in a solvent selected from the group consisting of tetrahydrofuran and ketones, said solvent containing dissolved therein free hydrogen chloride, the concentration of the hydrogen chloride based on the volume of the solvent being in the range of 0.01 to 1.0 mole per litre.

4. A composition comprising an α-chloroacrylonitrile polymer dissolved in an aliphatic ketone with not more than a total of six carbon atoms in the alkyl groups thereof, said solvent containing dissolved therein free hydrogen chloride.

5. A composition comprising an α-chloroacrylonitrile polymer dissolved in acetone, said solvent containing dissolved therein free hydrogen chloride.

6. A composition comprising an α-chloroacrylonitrile polymer dissolved in methyl ethyl ketone, said solvent containing dissolved therein free hydrogen chloride.

References Cited in the file of this patent
FOREIGN PATENTS 569,182   Great Britain _____ May 11, 1945